United States Patent [19]

Kuwahara et al.

[11] Patent Number: 5,363,306
[45] Date of Patent: Nov. 8, 1994

[54] ON-VEHICLE NAVIGATION APPARATUS

[75] Inventors: Shingo Kuwahara; Morio Araki, both of Kawagoe, Japan

[73] Assignee: Pioneer Electronic Corporation, Tokyo, Japan

[21] Appl. No.: 840,811

[22] Filed: Feb. 25, 1992

[30] Foreign Application Priority Data

Mar. 18, 1991 [JP] Japan .................. 3-052544

[51] Int. Cl.$^5$ .............................................. G06F 15/50
[52] U.S. Cl. ..................................... 364/449; 364/443; 340/990; 340/995
[58] Field of Search ............... 364/443, 444, 449; 73/178 R; 340/988, 990, 995; 379/58

[56] References Cited

U.S. PATENT DOCUMENTS

| | | | |
|---|---|---|---|
| 4,532,514 | 7/1985 | Hatano et al. | 364/449 |
| 4,660,037 | 4/1987 | Nakamura | 364/449 |
| 4,663,629 | 5/1987 | Tagami et al. | 340/988 |
| 4,688,244 | 8/1987 | Hannon et al. | 379/58 |
| 4,897,792 | 1/1990 | Hosoi | 340/990 |
| 4,963,865 | 10/1990 | Ichikawa et al. | 340/990 |
| 5,113,185 | 5/1992 | Ichikawa et al. | 340/990 |

FOREIGN PATENT DOCUMENTS

| | | |
|---|---|---|
| 508083220 | 5/1983 | Japan . |
| 2129797 | 5/1990 | Japan . |
| 2302615 | 12/1990 | Japan . |

Primary Examiner—Gary Chin
Attorney, Agent, or Firm—Fish & Richardson

[57] ABSTRACT

An on-vehicle navigation apparatus displays travel locus marks that permits a user to grasp the driving condition of a vehicle having this apparatus installed therein, while securing good visibility of the background map. The on-vehicle navigation apparatus has a storage means for storing a plurality of pieces of travel locus data in response to a predetermined collecting timing, and another storage means for storing an elapsed time from one predetermined collecting timing to the next predetermined collecting timing. The apparatus reads out the travel locus data and elapsed time $\Delta ti$ respectively from those storage means, designates different travel locus marks in accordance with the read-out elapsed time $\Delta ti$, and shows the travel locus marks on a display screen on the basis of read-out travel locus data. A traffic jam index Ji and a specific value may be used in place of the elapsed time $\Delta ti$.

8 Claims, 9 Drawing Sheets

5,363,306

ON-VEHICLE NAVIGATION APPARATUS

BACKGROUND OF THE INVENTION

1. Field of the Invention

The present invention relates to an on-vehicle navigation apparatus, and, more particularly, to an on-vehicle navigation apparatus which collects information on the locus of a moving vehicle on the basis of map information and the location of the vehicle, and displays the information on a display device (hereinafter referred to as "display").

2. Description of Background Information

Today on-vehicle navigation apparatus are practical and structured so that map information is stored in a memory, map information is read-out from the memory and displayed with the current location of a vehicle to guide the vehicle to a predetermined destination.

In general, the on-vehicle navigation apparatus displays the travel locus of the vehicle in which the navigation apparatus is mounted based on the vehicle location information at a given travel distance or given driving or running period of time.

If travel locus data is collected at each given travel distance and a plurality of travel locus marks which show an associated single collected travel locus are displayed on a map, a user cannot see how fast the vehicle has been driving. On the other hand, if travel locus data is collected and displayed after a given traveling time, travel locus marks collected during low-speed driving conditions would be congested, making the background map difficult to see or illegible.

OBJECT AND SUMMARY OF THE INVENTION

It is therefore an object of the present invention to provide an on-vehicle navigation apparatus which can display travel locus marks that allow a user access to the driving speed of a vehicle on which the apparatus is mounted as well as driving conditions, while maintaining good visibility of the background map.

An on-vehicle navigation apparatus according to the present invention includes a designation means for designating a travel locus mark from among a plurality of travel locus marks in accordance with the passage of time between one predetermined collecting time and the next predetermined collecting time, a reading means for retrieving the travel locus marks, and a display control means for showing the travel locus mark on a display screen based on the travel locus data retrieved by the reading means.

According to another aspect of the present invention, an on-vehicle navigation apparatus includes a designation means for designating a travel locus mark from among a plurality of travel locus marks in accordance with a traffic jam index from one predetermined collecting time to the next predetermined collecting time, a reading means for retrieving the travel locus marks, and a display control means for showing the travel locus mark on a display screen based on the travel locus data read out by the reading means.

An on-vehicle navigation apparatus according to a further aspect of the present invention includes a means for storing vehicle-location information as travel locus data in travel locus data storage means and storing a specific value as an elapsed time from one predetermined collecting time to the next collecting time into an elapsed time storage means when a vehicle is in a non-driving condition, designation means for designating a travel locus mark from among a plurality of travel locus marks in accordance with passage of time retrieved by reading means, and display control means for showing the travel locus mark on a display screen based on the travel locus data read out by the reading means.

An on-vehicle navigation apparatus according to a still further aspect of the present invention includes a means for storing vehicle-location information as travel locus data in a travel locus data storage means and storing a specific value as a traffic jam index from one predetermined collecting time to a next collecting time into a traffic jam index storage means when a vehicle is in a non-driving condition, designation means for designating a travel locus mark from among a plurality of travel locus marks in accordance with passage of time retrieved by the reading means, and display control means for showing the travel locus mark on a display screen based on the travel locus data read out by the reading means.

The on-vehicle navigation apparatus embodying the present invention displays a travel locus mark from among a plurality of travel locus marks corresponding to the elapsed time between the time for collecting one piece of travel locus data and the time for collecting the next piece of travel locus data, the elapsed time being stored together with that travel locus data.

The on-vehicle navigation apparatus embodying the present invention displays a different travel locus mark corresponding to the traffic jam index from the time for collecting one piece of travel locus data to the time for collecting the next piece of travel locus data, the traffic jam index being stored together with that travel locus data.

DETAILED DESCRIPTION OF THE PREFERRED EMBODIMENTS

Figure 1:
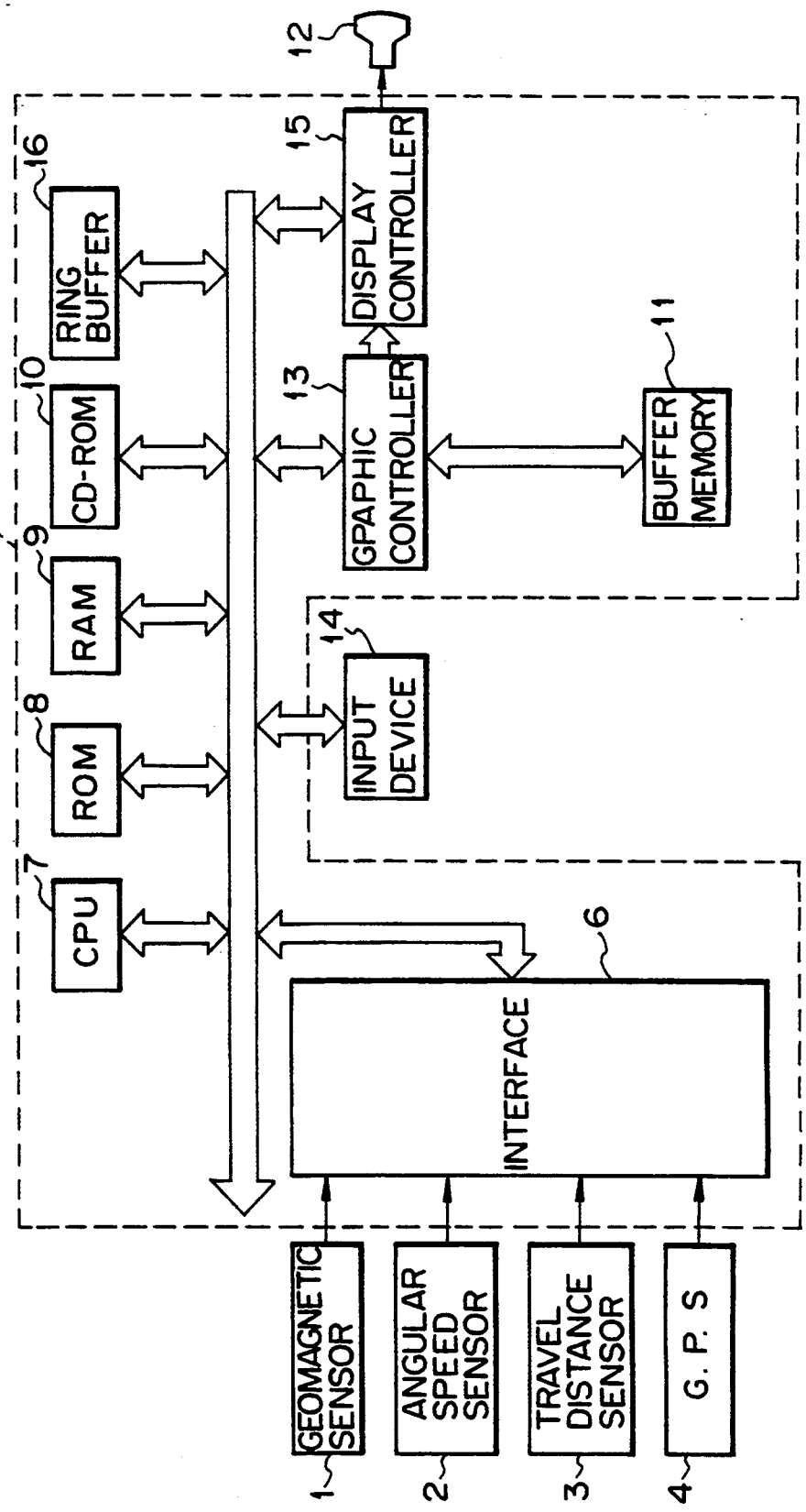
FIG. 1 is a block diagram illustrating the structure of an on-vehicle navigation apparatus embodying the present invention.

FIG. 1 illustrates an example of an on-vehicle navigation apparatus. Preferred embodiments of the present invention will now be described in detail with reference to FIG. 1.

As shown in FIG. 1, a geomagnetic sensor 1 outputs direction data on a vehicle based on the geomagnetism (geomagnetic field). An angular speed sensor 2 detects an angular speed of the vehicle. A travel distance sensor 3 detects the traveling distance of the vehicle. A GPS (Global Positioning System) device 4 detects the current location of the vehicle in accordance with latitude and longitude information. Outputs from the sensors and the device are supplied to a system controller 5.

The system controller 5 comprises an interface 6, a CPU (Central Processing Unit) 7, a ROM (Read Only Memory) 8, a RAM (Random Access Memory) 9, a recording medium 10, a buffer memory 11, a graphic controller 13 and a display controller 15. The interface 6 receives outputs from sensors 1, 2, 3 and GPS device 4 to perform functions including analog-to-digital conversion. The CPU 7 executes various image data processes, and computes the driving distance and location of the vehicle based on the data from sensors 1, 2, 3 and GPS device 4 which are sequentially sent from the interface 6. In the ROM 8 various processing programs for the CPU 7 and other necessary information has been previously stored. The RAM 9 is accessible so that information necessary for executing the processing programs is written there or retrieved from there. The recording medium 10 is comprised of a CD-ROM or IC card and has digitized map information recorded there. The buffer memory 11 is comprised of a V-RAM (Video RAM) or the like which temporarily stores image information to be immediately displayed, as a frame buffer. The graphic controller 13 writes data, such as map information, sent in response to a command from the CPU 7, into the buffer memory 11 and outputs the data as image information. The display controller 15 controls a liquid crystal display or a display 12, such as a CRT, in accordance with the image information sent from the graphic controller 13. An input device 14 comprised of a keyboard or the like sends various commands to the system controller 5 when a user uses the keys. A ring buffer 16 is static type memory which always stores recorded data powered by an internal battery. The ring buffer 16 stores travel locus data.

Figure 2:
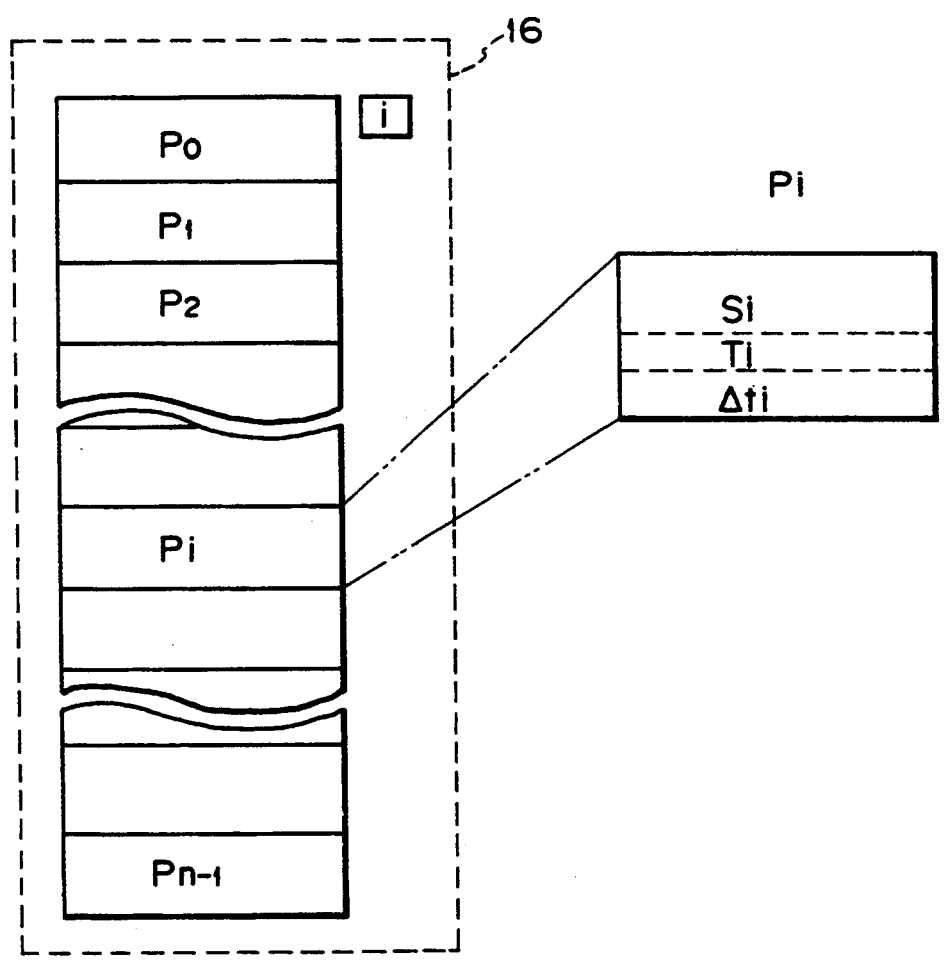
FIG. 2 is a diagram for explaining a ring buffer which stores travel locus data.
Figure 3:
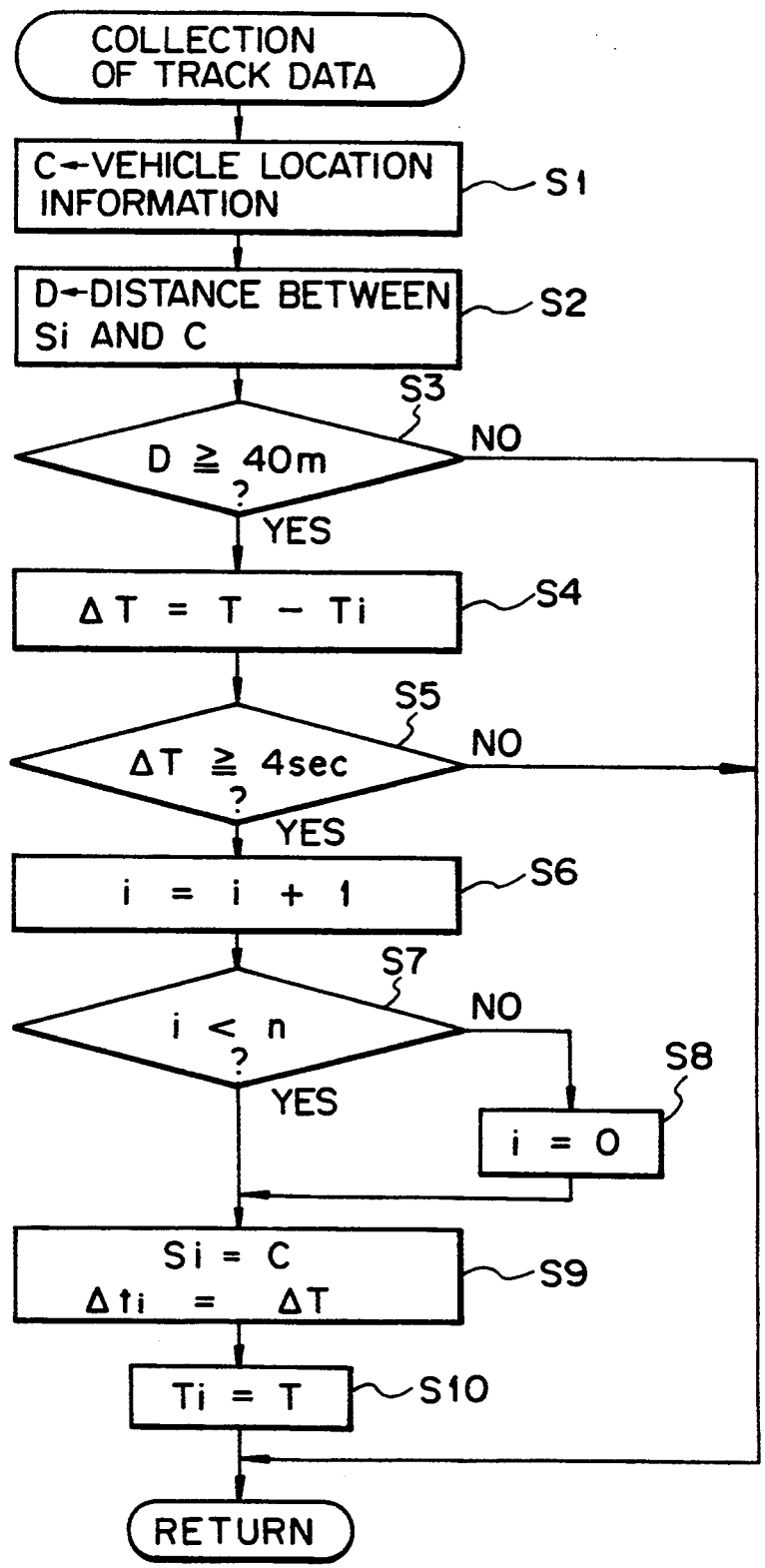
FIG. 3 is a flowchart for explaining procedures for collecting the travel locus data according to a first embodiment of the present invention.

FIG. 2 shows the memory map of the ring buffer 16 which stores travel locus data of a vehicle (hereafter referred to as simply "travel locus data"). FIG. 3 is a flowchart showing the procedures which CPU 7 executes to collect travel locus data in cooperation with the ring buffer 16. A first embodiment will now be explained referring to FIGS. 2 and 3.

In FIG. 2, the ring buffer 16 includes packets $P_0$ to $P_{n-1}$; each packet is a predetermined data block. The subscript "n" is the number of packets that can be stored in ring buffer 16. A specific packet $P_i$ ($i=0, 1, \ldots, n-1$) is designated by packet number i, and predetermined packet data for that designated packet is written in or retrieved from ring buffer 16. The packet number i is a pointer which indicates the last packet that was written to or read from in the ring buffer 16. When writing or reading new data is requested and the packet number i indexes the last packet in the ring buffer 16. The packet number i is shifted to index the first packet. Otherwise, the packet number i is incremented to index the next packet.

The packet $P_i$ secures a memory area for storing travel locus data, i.e., longitude/latitude data $S_i$ representing collecting points on the map, as well as data $\Delta t_i$ of the elapsed time between the previous travel locus data collecting time and the current travel locus data collecting time, and time $T_i$ for collecting the travel locus data. The longitude/latitude data $S_i$ and the elapsed time data $\Delta t_i$ among the packet data to be stored in one packet serve as one piece of travel locus information at the collection time.

In FIG. 3, when the operation moves from a main routine (not shown) to a routine for collecting travel locus data, the CPU 7 acquires longitude/latitude data C for the location of the vehicle, or the current position by the system (step S1). The CPU 7 computes a travel distance D from the previous travel locus data collecting position to the current position based on the longitude/latitude data C and the longitude/latitude data $S_i$ in the last write packet $P_i$ (step S2).

The CPU 7 then determines whether the travel distance D has reached a predetermined distance, for example, 40 meters (step S3). If the travel distance D has not reached the predetermined distance, the CPU 7 terminates the subroutine and returns to the main routine. This process specifies the minimum distance required to accurately draw the travel locus of the vehicle on the map. The predetermined distance has to satisfy the specified distance when the vehicle is driving at a low speed.

As the vehicle continues, the subroutine is invoked again from the main routine to perform steps S1 and S2. When the travel distance D reaches 40 m, the CPU 7 subtracts the previous travel locus data collecting time $T_i$ in the last write packet $P_i$ from the current time T that the system is holding to provide an elapsed time $\Delta T$ (step S4). The CPU 7 determines whether elapsed time $\Delta T$ equals a predetermined time, for example, 4 seconds (step S5). If the time $\Delta T$ does not equal 4 seconds, CPU 7 terminates the subroutine and returns to the main routine. In this manner, the number of pieces of insignificant travel locus data during highspeed driving, i.e., the travel locus data to be stored in the ring buffer 16 will be reduced. When the vehicle is moving at a low speed, the predetermined time only needs to equal a travel locus data collecting time when the travel locus of the vehicle can be accurately drawn on the map.

As the vehicle continues, the subroutine is invoked again in the main routine to perform steps S1, S2, S3 and S4. When the elapsed time $\Delta T$ equals 4 sec, the CPU 7 issues a travel locus data collecting command to the ring buffer 16, and increments the packet number i by "1" (step S6). It is then determined whether the packet number i is equal to or greater than the storable number of packets n (step S7). If the packet number i is equal to or greater than n, i=0 (step S8). Steps S6, S7 and S8 are performed by the ring buffer 16.

If the packet number i is less than the storable number of packets n, the longitude/latitude data C for the current point and the elapsed time $\Delta T$ in steps S1 and S4 are stored in the ring buffer 16 as longitude/latitude data Si in the selected packet Pi and the data $\Delta t_i$ of the time having elapsed from the previous travel locus data collecting time (step S9), respectively. As the longitude/latitude data $S_i$ and the elapsed time data $\Delta t_i$ are stored in one packet specified by the packet number i, one piece of travel locus data is collected.

The current time T is stored as the current travel locus data collecting time data $T_i$ in the specified packet Pi with the elapsed time data $\Delta t_i$ (step S10). This ends the subroutine.

In this embodiment as described above, the CPU 7 determines the traveling distance from the previous travel locus data collecting position to the current position in step S3, and the travel locus data is collected only if the travel distance equals a predetermined distance and the time elapsed from the previous travel locus data collecting time to the current time equals a predetermined time. As a result, the ring buffer 16 avoids storing insignificant travel locus data during high-speed driving and holds only valid travel locus data without losing the accuracy of the travel locus of the vehicle on the map.

Figure 4:
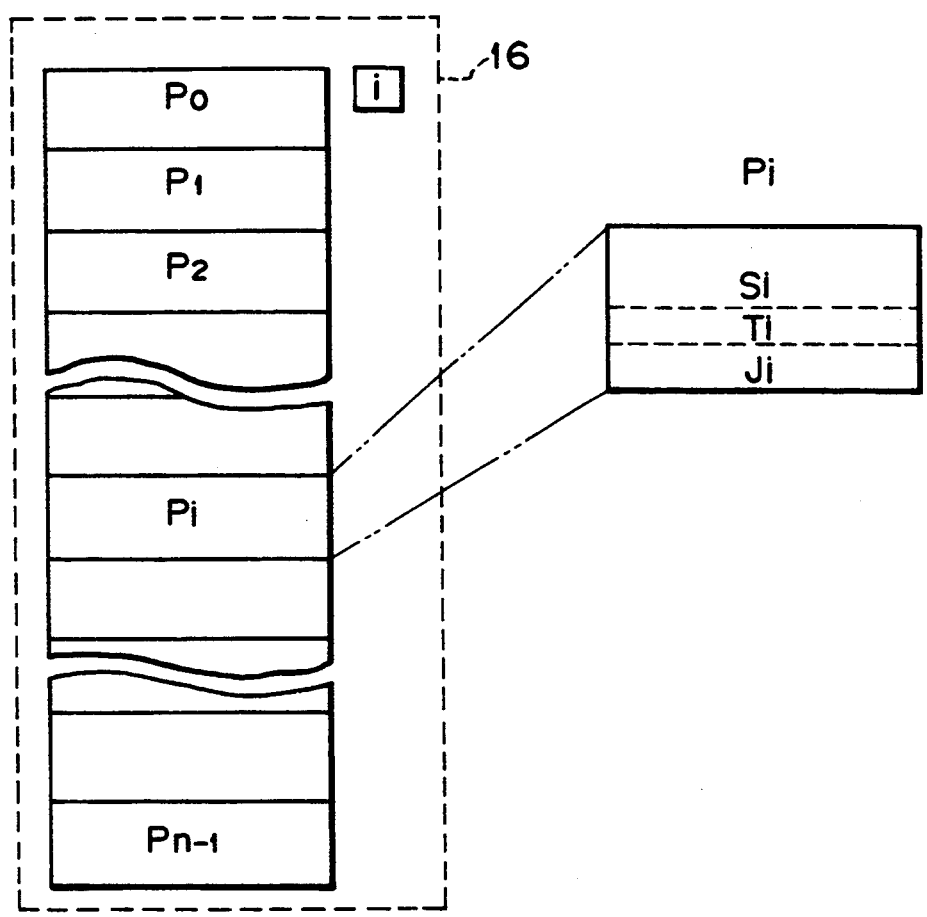
FIG. 4 is a diagram for explaining a ring buffer which stores travel locus data.
Figure 5:
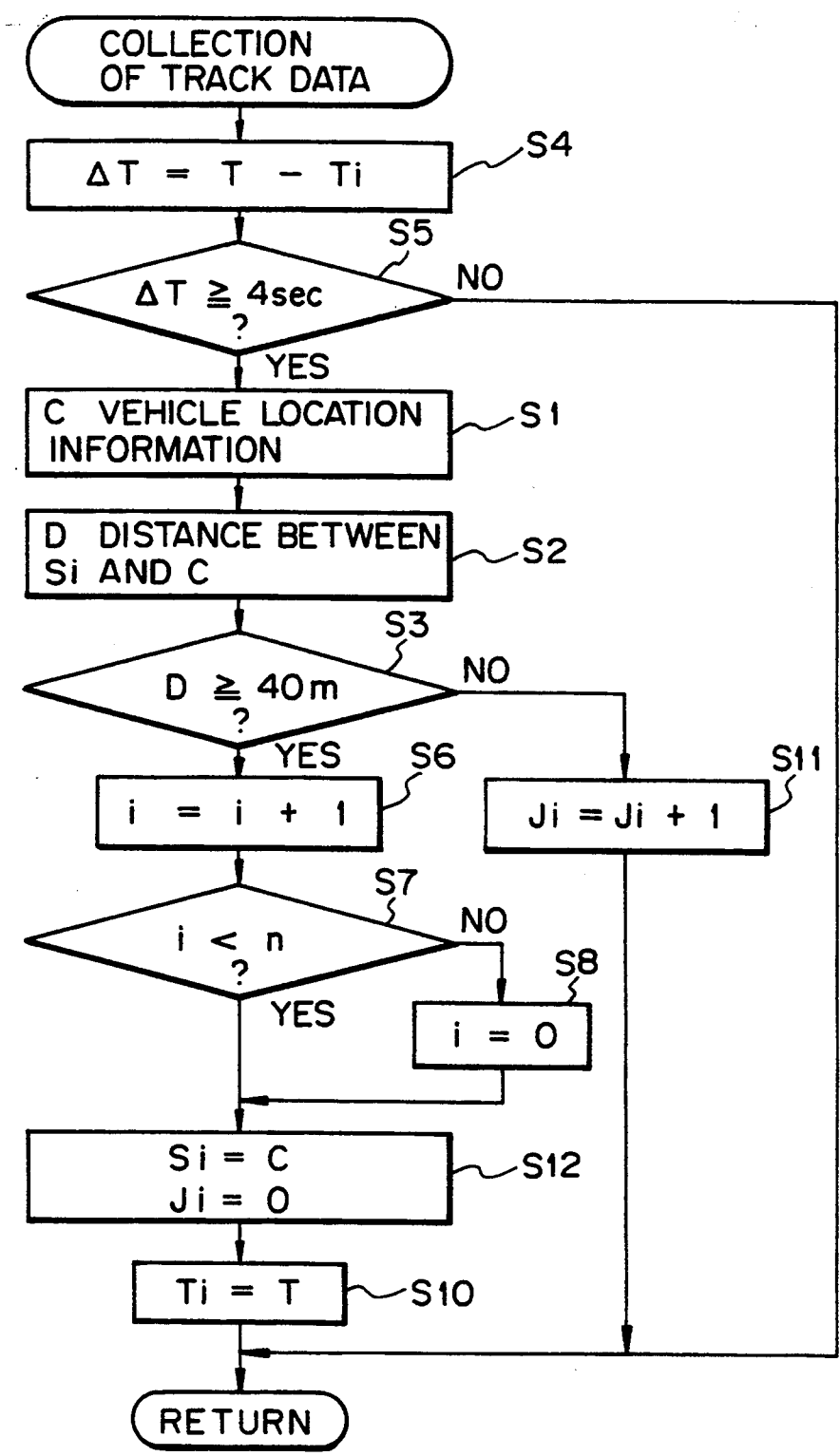
FIG. 5 is a flowchart for explaining procedures for collecting the travel locus data according to a second embodiment of the present invention.

FIG. 4 shows a memory map of the ring buffer 16 as an example of a storage medium for storing travel locus data. FIG. 5 is a flowchart showing a sequence of procedures which CPU 7 executes to collect travel locus data in cooperation with the ring buffer 16. A second embodiment will now be described referring to FIGS. 4 and 5.

Like or same reference numerals and drawings as used in FIG. 2 are used in FIG. 4 to denote corresponding or identical elements to thereby avoid redundant explanation. According to this embodiment, the memory area for the elapsed time data $\Delta t_i$ as in FIG. 2 stores traffic jam index $J_i$, to be described later. The index $J_i$ and longitude/latitude data $S_i$ are travel locus information.

The same reference numerals or step numbers as used in FIG. 3 are used to indicate corresponding or identical steps in FIG. 5 to avoid redundant explanation.

First, in step S4 CPU 7 computes an elapsed time $\Delta T$ from the previous travel locus data collecting time to the current time. The CPU 7 determines in step S5 whether the elapsed time $\Delta T$ equals a predetermined time, for example, 4 seconds. The travel locus data can be collected at each predetermined time interval in this embodiment. If the time $\Delta T$ does not equal 4 sec, CPU 7 terminates the subroutine and returns to the main routine.

As the vehicle continues, the subroutine is called again in the main routine to perform step S4. If the elapsed time $\Delta T$ equals 4 sec, the flow moves to step S1. In steps S1 and S2, the CPU 7 computes the travel distance D from the previous travel locus data collecting position $S_i$ to the current location C. It is then determined in step S3 whether the travel distance D is greater than or less than a predetermined distance, for example, 40 m.

If the travel distance D from the previous travel locus data collecting position $S_i$ to the current position C does not equal the predetermined distance of 40 m, the CPU 7 determines that the vehicle is caught in traffic, and increments the traffic jam index $J_i$ by "1" (step S11). The packet number i at this time is held as it is when the previous travel locus data is collected. The ring buffer 16 can update just the traffic jam index in the previously stored packet data. The subroutine is then terminated and the flow returns to the main routine. This process reduces the number of insignificant pieces of travel locus data collected while driving at a low speed or in traffic, i.e., the number of pieces of travel locus data to be stored in ring buffer 16.

If the travel distance D does not equal the predetermined distance of 40 meters in step S3 even though the subroutine has been invoked several times, the traffic jam index $J_i$ associated with the previous travel locus data continues to be incremented in step S11 each time. In accordance with the traffic jam index $J_i$, the CPU 7 recognizes how slow the speed is or how heavy the traffic is.

As the vehicle continues, the subroutine is invoked again from the main routine to perform steps S4, S5, S1, S2, and S3 sequentially. If the travel distance D equals 40 m, the CPU 7 issues a travel locus data collecting command to the ring buffer 16. The packet number i is incremented by "1" in step S6. It is determined in step S7 whether the packet number i is greater than or less than the storable number of packets n. If the packet number i is equal to or greater than n, i=0 in step S8.

On the basis of the new packet number i yielded in step S7 or S8, the longitude/latitude data C of the current position acquired in step S1 is treated as the longitude/latitude data $S_i$ for the travel locus data that is to be collected this time, and the traffic jam index data $J_i=0$ is stored in the packet $P_i$ (step S12). Since the longitude/latitude data $S_i$ and the traffic jam index data $J_i$ are stored in one packet, one piece of travel locus data is collected.

In step S10, the current time T is stored as the current travel locus data collecting time data $T_i$ in the specified packet $P_i$, together with the traffic jam index data $J_i$. This ends the subroutine.

According to the embodiment described above, the CPU 7 determines the traveling time from the previous travel locus data collecting time to the current time as in step S5, and the travel locus data is collected only if the elapsed time equals a predetermined time and the vehicle has driven a predetermined distance. As a result, it is possible to avoid storing insignificant travel locus data in the ring buffer 16 during low-speed driving or when driving in traffic and store only valid travel locus data without losing the accuracy of the travel locus of the vehicle on the map.

The main routines in both the first and second embodiments have procedures to invoke subroutines for collecting individual pieces of travel locus data before the predetermined distance of 40 meters is covered and the predetermined time of 4 seconds passes.

According to the first and second embodiments, the current time T in collecting travel locus data is stored as the time $T_i$ where that travel locus data is collected with longitude/latitude data in the memory. It is therefore easy to acquire a traveling time between arbitrary locations on the travel locus of the moving vehicle or the location of the vehicle at any given time from the stored time $T_i$.

The elapsed time data $\Delta t_i$ in the first embodiment and the traffic jam index data $J_i$ in the second embodiment can also provide the traveling time in an arbitrary interval on the travel locus. Since the traveling time is the sum of time intervals from one point to the next point, multiplication of the elapsed times in an arbitrary interval needs to be performed. The traffic jam index data $J_i$ is also elapsed time information which represents how long it takes for the vehicle to cover a predetermined distance after driving for a predetermined time. The traveling time can therefore be calculated in a similar manner referring to the traffic jam index data $J_i$.

The foregoing description of the first and second embodiments has also been given with reference to the case which collecting the travel locus data, the collecting time $T_i$, and the elapsed time $\Delta t_i$, or the traffic jam index $J_i$ are stored with the longitude/latitude data $S_i$ into the memory. For the purpose of simply drawing the travel locus of the moving vehicle on the map without acquiring the traveling time or the location of the vehicle, the elapsed time and the traffic jam index need not be derived.

Figure 6:
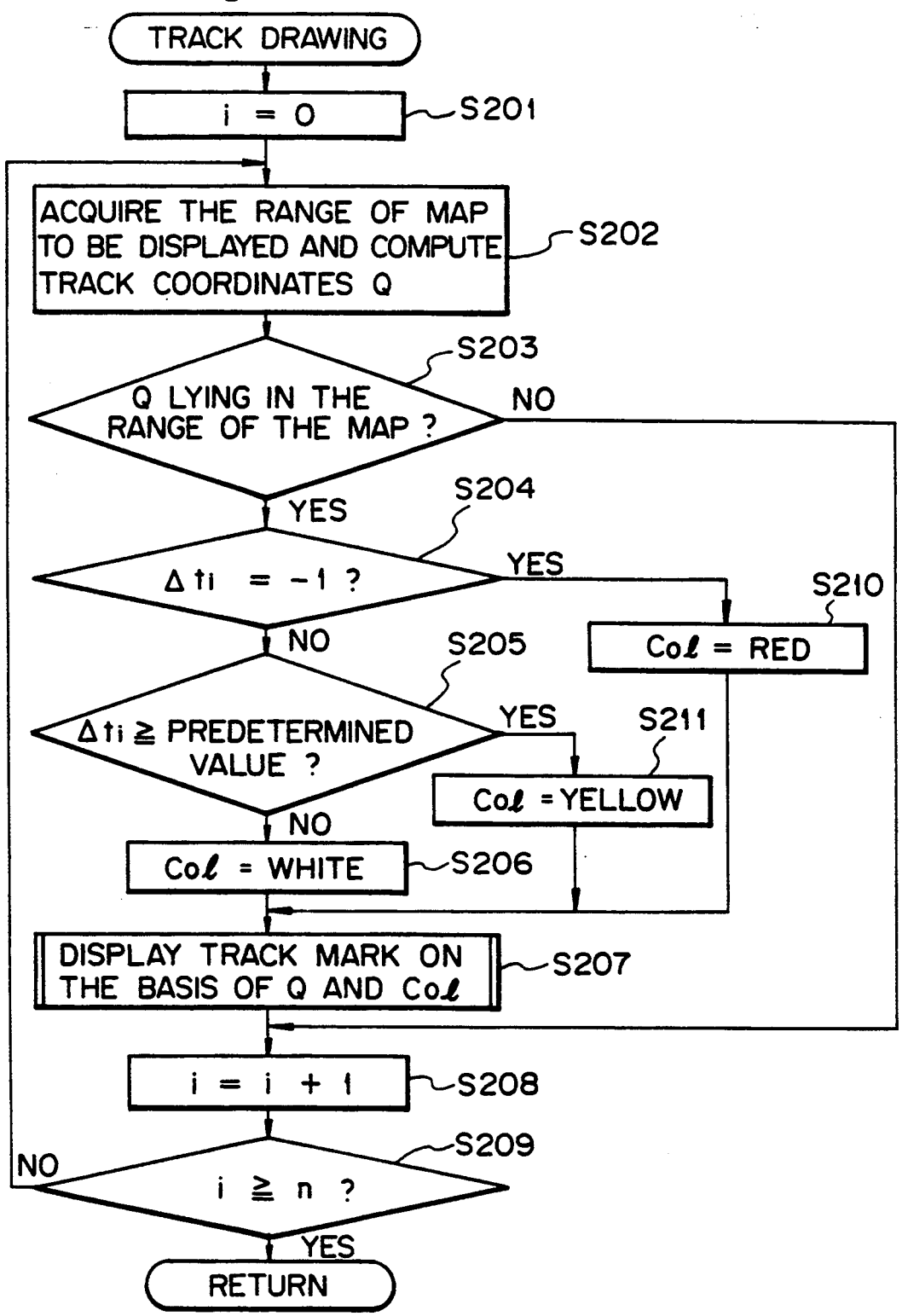
FIG. 6 is a flowchart for explaining procedures for drawing the travel locus of a vehicle according to a third embodiment of the present invention.

FIG. 6 presents a flowchart illustrating a routine for drawing travel locus data at the time the travel locus of a vehicle is drawn on the buffer memory 11 on the basis of the travel locus data acquired by the first embodiment, and is displayed together with map information on the display 12 via the graphic controller 13 and display controller 15. A third embodiment will now be described along this flowchart.

Figure 7:
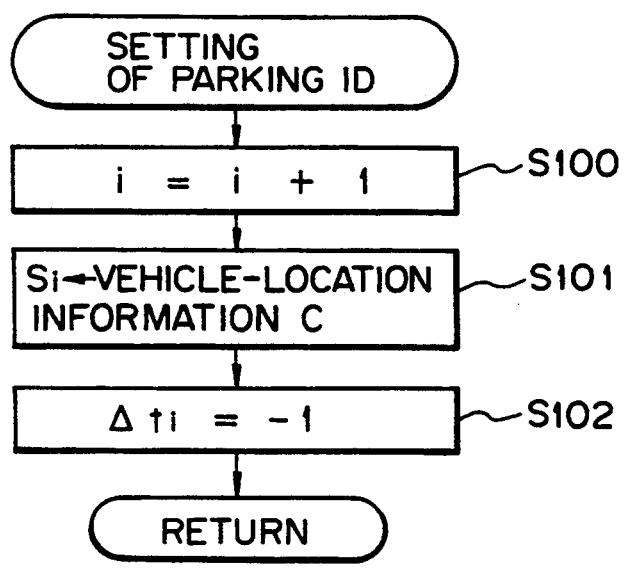
FIG. 7 is a flowchart for explaining procedures for inserting a parking ID in elapsed time data according to the third embodiment of the present invention.

According to this embodiment the system will execute the sequence of processes shown in FIG. 7 in order to check the parking condition of the vehicle immediately after the engine is stopped or activated. The system specifies the next packet after the last-written packet in the first embodiment (step S100), and stores the longitude/latitude data of the current position or the information of the vehicle's location as the longitude/latitude data $S_i$ in the specified packet (step S101). Then, a specific value indicating the deactivation or activation of the engine (hereinafter called "ID value") is stored as the elapsed time $\Delta t_i$ (step S102). This value is preferably a value which can never be attained in the processing done in the first embodiment. Assuming that $\Delta t_i$ has a value which then increases in the positive direction from zero, "−1" or another impossible inconceivable value would be selected as the ID value. When the ID value is stored as the elapsed time $\Delta t_i$ in the packet $P_i$, the flow returns to the main routine.

When the flow moves from the main routine (not shown) to the routine for drawing the travel locus of the vehicle in FIG. 6, the CPU 7 first sets the packet number i to be used in this subroutine to "0" (step S201). The CPU 7 then acquires the range of the map information to be displayed from the coordinates on the display screen, and computes the travel locus coordinates Q ($x_i$, $y_i$) from the longitude/latitude data $S_i$ of the travel locus data specified by the packet number i to show the travel locus mark on the display screen (step S202).

Then, the CPU 7 compares the acquired range of the map information to be displayed with the travel locus coordinates Q ($x_i$, $y_i$) to determine whether the travel locus coordinates lie within the range of the map information to be displayed (step S203). When the travel locus coordinates Q ($x_i$, $y_i$) are out of the range of the map information to be displayed, the packet number i is incremented by "1" (step S208), and the resultant packet number i is compared with the storable number of packets n (step S209). When the packet number i is less than or equal to the number n, the flow returns to step S202. However, when i is greater than n, the flow returns to the main routine.

If the travel locus coordinates Q ($x_i$, $y_i$) lie within the range of the map information to be displayed in step S203, it is determined whether or not the elapsed time $\Delta t_i$ in the travel locus data specified by the packet number i equals the parking ID value "−1" which was stored as the elapsed time $\Delta t_i$ upon activation of the engine as described above (step S204). When the elapsed time $\Delta t_i$ equals "−1," the color number Col of the travel locus mark is set to red (step S210). The travel locus mark indicates a location on the map based on the longitude/latitude data in the travel locus data, and the color number Col designates the display color for the travel locus mark to be displayed on the screen by the graphic controller 13, for example.

When the elapsed time $\Delta t_i$ does not equal "−1" in step S204, it is compared with a predetermined value for discrimination (step S205). When $\Delta t_i$ equals or greater than the predetermined value, the color number Col of the travel locus data is set to yellow (step S211). When $\Delta t_i$ is less than the predetermined value, the color number Col is set to white (step S206). This predetermined value is used as a reference to determine whether the vehicle has been driving at a low speed or in traffic. This value may be set by the system or by the user depending on the purpose.

Through steps S204 and S205, the driving condition at the time of collecting the travel locus data of the vehicle is determined, and red designates the travel locus mark for the location where the engine is stopped, while yellow and white driving in traffic and normal driving, respectively.

The travel locus mark is shown at the travel locus coordinates Q ($x_i$, $y_i$) on the display screen and the display is controlled based on the specified color number (step S207).

Thereafter, every time the packet number i is incremented in step S208, a single piece of travel locus data for a single packet number will undergo a comparison with the range of the map information to be displayed, the engine stop ID value, and the predetermined value. Therefore, only travel locus data that should be displayed with the color number will be displayed until the packet number i reaches the maximum storable number of packets n in step S209. When i reaches n, the CPU 7 terminates this subroutine and returns to the main routine.

According to this embodiment, the elapsed time $\Delta t_i$ of the travel locus data in the first embodiment is used as a parameter to display the travel locus mark in different colors according to particular driving conditions. This display technique permits the user to determine the previous driving conditions from the different colors of the travel locus marks. In the case of the non-driving condition, such as activation or deactivation of the engine, a specific value is stored as the elapsed time $\Delta t_i$ and is displayed with a specific travel locus mark to allow the user to find an unusual point on the travel locus.

Figure 8:
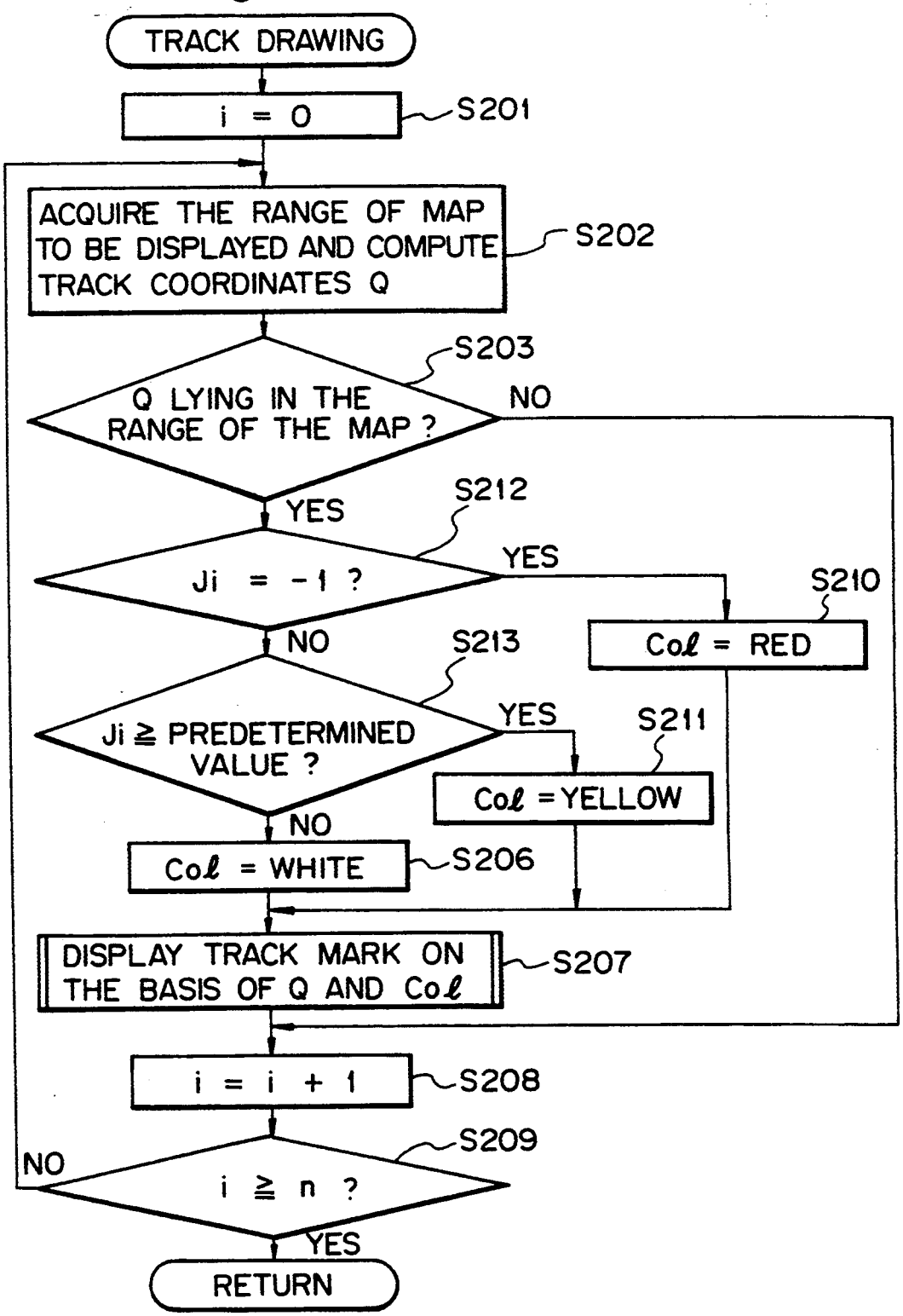
FIG. 8 is a flowchart for explaining procedures for drawing the travel locus of a vehicle according to a fourth embodiment of the present invention.

FIG. 8 presents a flowchart for explaining a routine for drawing the travel locus of a vehicle in accordance with the third embodiment of the present invention. Based on this flowchart, a fourth embodiment will be described. The same reference numerals or step numbers as used in FIG. 6 are used to indicate corresponding or identical steps in FIG. 8 to thereby eliminate redundant explanation.

Figure 9:
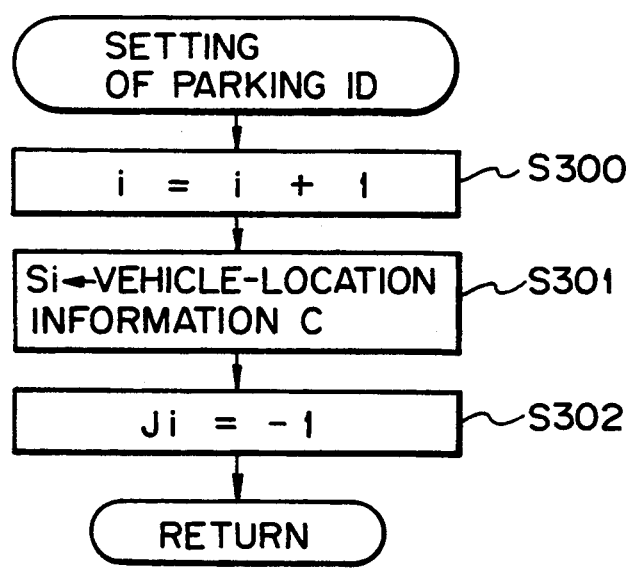
FIG. 9 is a flowchart for explaining procedures for inserting a parking ID in traffic jam index data according to the fourth embodiment of the present invention.

According to this embodiment the system will execute the sequence of processes shown in FIG. 9 in order to check the parking conditions of the vehicle immediately after the engine is stopped or activated. The system specifies the next packet after the last-written packet in the second embodiment (step S300), and stores the longitude/latitude data of the current position or the information of the vehicle's location, C as the longitude/latitude data $S_i$ in the specified packet (step S301). Then, an ID value indicating the deactivation or activation of the engine is stored as the traffic jam index $J_i$ (step S302). When the ID value is stored as the traffic jam index $J_i$ in the packet $P_i$, the flow returns to the main routine.

When the flow moves from the main routine to the routine for drawing the travel locus of the vehicle in FIG. 8, the CPU 7 first sets the packet number i to be used in this subroutine to "0" in step S201, and then acquires the range of the map information to be displayed and computes the travel locus coordinates Q ($x_i$, $y_i$) from the longitude/latitude data $S_i$ specified by the packet number i in step S202.

Then, the CPU 7 compares the range of the map information to be displayed with the travel locus coordinates Q ($x_i$, $y_i$) in step S203. When the travel locus coordinates Q ($x_i$, $y_i$) are out of the range of the map information to be displayed, the flow moves on to steps S208 and S209 which will be executed in the same way as done in the third embodiment.

If the travel locus coordinates Q ($x_i$, $y_i$) lie within the range of the map information to be displayed in step S203, it is determined whether or not the traffic jam index $J_i$ specified by the packet number i equals the ID value "−1" which was stored as the traffic jam index $J_i$ upon activation of the engine as described above (step S212). When the traffic jam index $J_i$ equals "−1," the color number Col of the travel locus mark is set to red in step S210.

When the traffic jam index $J_i$ equals "−1" in step S212, it is compared with a predetermined value, for example, "0" (step S213). When the traffic jam index $J_i$ is equal to or greater than the predetermined value, the color number Col of the travel locus data is set to yellow in step S211. When the traffic jam index Ji is less than the predetermined value, the color number Col is set to white in step S206. This predetermined value is used as a reference for determining whether the vehicle has been driving at a low speed or in traffic. This may be set value by the system or by the user depending on the purpose. If the predetermined value is set to "0" as in this embodiment, it is apparent that the value of the travel distance D, 40 m, at which the traffic jam index will be incremented every given time as in the second embodiment, is a reference to indicate a traffic jam.

Through the steps S212 and S213, the driving condition at the time of collecting the travel locus data of the vehicle is determined, and red designates the travel locus mark for the location where the engine is stopped, while yellow and white indicate driving in traffic and normal driving, respectively.

In step S207, the travel locus mark is shown at the travel locus coordinates Q ($x_i$, $y_i$) on the display screen and the display is controlled on the basis of the specified color number Col.

Thereafter, every time the packet number i is incremented in step S208, a single piece of travel locus data for a single packet number will undergo a comparison with the range of the map information to be displayed, the engine stop ID value, and the predetermined value. Therefore, only the travel locus data that should be displayed together with the color number will be displayed until the packet number i reaches the maximum storable number of packets n in step S209. When i reaches n, the CPU 7 terminates this subroutine and returns to the main routine.

According to this embodiment, the traffic jam index $J_i$ of the travel locus data in the second embodiment is used as a parameter to display the travel locus mark in different colors according to particular driving conditions. This display technique permits the user to determine the previous driving conditions from the different color travel locus marks. In the case of the non-driving condition, such as upon activation or deactivation of the engine, a specific value is stored as the traffic jam index $J_i$ and is displayed with a specific travel locus mark to allow the user to find an unusual point on the travel locus.

Although the foregoing description of the third and fourth embodiments has been given with reference to the case where the driving conditions of the vehicle are displayed by designating different colors for the travel locus marks, this invention is not limited to this display technique. For instance, the driving conditions may be indicated by altering the shape of the travel locus mark. Further, the driving conditions need not be restricted to the three states, namely, parking, driving through a traffic jam and normal driving. More driving conditions may be indicated by classifying in more detail the elapsed time or the traffic jam index.

Moreover, classification of the driving conditions may be done without using the elapsed time. Namely, in the case where the collecting time $T_i$ is stored with the longitude/latitude data, as in the first and second embodiments, if the elapsed time from the time for collecting one piece of travel locus data to the time for collecting the next piece of travel locus data is computed each time and the acquired elapsed time is determined, the classified display of the driving conditions, like the one described previously, can be accomplished although the processing speed will be slightly slower.

Further in the embodiments, travel locus information is stored in a ring buffer, and travel locus data is held in one packet. The storage means is not limited to this particular type, and it may be accomplished by a memory having the function of an ordinary RAM. As long as the collecting time $T_i$, the elapsed time $\Delta t_i$, and the traffic jam index $J_i$ can be associated with the longitude/latitude data stored at the same collecting time, these pieces of data need not be stored in the same packet.

The non-driving condition is not limited to the point of the activation or deactivation of the engine of the vehicle, but also includes when the travel distance does not increase even when a specific period of time has elapsed. In this case no parking ID value is required and only the elapsed time data or traffic jam index data are sufficient to check the non-driving condition.

According to the present invention, as described above, the travel locus of a vehicle is displayed with different travel locus marks in accordance with the driving conditions based on the collecting time stored together with travel locus data, or the elapsed time or traffic jam index from the previous travel locus data collecting time to the current travel locus data collecting time, thus permitting the user to visually understand the driving speed and driving conditions without losing good visibility of the background map.

What is claimed is:

1. An on-vehicle navigation apparatus comprising:
    travel locus data storage means for storing a plurality of pieces of travel locus data in response to a predetermined collecting time;
    elapsed time storage means for storing an elapsed time from said predetermined collecting time for one piece of travel locus data to a next predetermined collecting time for a next piece of travel locus data;
    reading means for retrieving said travel locus data and said elapsed time from said travel locus data storage means and said elapsed time storage means, respectively;
    designation means for designating one travel locus mark from among a plurality of travel locus marks and driving conditions associated with said designated travel locus mark in accordance with said elapsed time retrieved by said reading means; and display control means for displaying said travel locus marks on a display screen based on said travel locus data retrieved by said reading means.

2. An on-vehicle navigation apparatus comprising:

travel locus data storage means for storing a plurality of pieces of travel locus data at a predetermined collecting time;

traffic jam index storage means for storing a traffic jam index from said predetermined collecting time for one piece of travel locus data to a next predetermined collecting time for a next piece of travel locus data;

reading means for retrieving said travel locus data and said traffic jam index from said travel locus data storage means and said traffic jam index storage means, respectively;

designation means for designating one travel locus mark from among a plurality of travel locus marks in accordance with said traffic jam index retrieved by said reading means; and display control means for displaying said travel locus marks on a display screen based on said travel locus data retrieved by said reading means.

3. An on-vehicle navigation apparatus according to claim 2, wherein said traffic jam index is time information since a point of time where a predetermined time has elapsed after said predetermined collecting time for said one piece of travel locus data until said predetermined collecting time for said next piece of travel locus data.

4. An on-vehicle navigation apparatus comprising:

vehicle-location information generating means for generating information regarding a location of a vehicle;

travel locus data storage means for storing a plurality of pieces of travel locus data at a predetermined collecting time;

elapsed time storage means for storing an elapsed time from said predetermined collecting time for one piece of travel locus data to a next predetermined collecting time for a next piece of travel locus data;

reading means for retrieving said travel locus data and said elapsed time from said travel locus data storage means and said elapsed time storage means, respectively;

means for storing said vehicle-location information as travel locus data in said travel locus data storage means and storing said elapsed time as a specific value that indicates deactivation or activation of a vehicle;

designation means for designating one travel locus mark from among a plurality of travel locus marks in accordance with said elapsed time retrieved by said reading means; and display control means for displaying said travel locus marks on a display screen based on said travel locus data retrieved by said reading means.

5. An on-vehicle navigation apparatus according to claim 4, wherein a non-driving condition is when said vehicle engine is activated or deactivated the vehicle is in a non-driving condition.

6. An on-vehicle navigation apparatus comprising:

vehicle-location information generating means for generating information regarding a location of a vehicle;

travel locus data storage means for storing a plurality of pieces of travel locus data at a predetermined collecting time;

traffic jam index storage means for storing a traffic jam index from said predetermined collecting time for one piece of travel locus data to a next predetermined collecting time for a next piece of travel locus data;

reading means for retrieving said travel locus data and said traffic jam index from said travel locus data storage means and said traffic jam index storage means, respectively;

means for storing said vehicle-location information as travel locus data in said travel locus data storage means and storing said traffic jam index as a specific value that indicates deactivation or activation of a vehicle engine;

designation means for designating one travel locus mark from among a plurality of travel locus marks in accordance with said traffic jam index retrieved by said reading means; and display control means for displaying said travel locus marks on a display screen based on said travel locus data retrieved by said reading means.

7. An on-vehicle navigation apparatus according to claim 6, wherein said traffic jam index is time information since a point of time where a predetermined time has elapsed after said predetermined collecting time for said one piece of travel locus data until said predetermined collecting time for said next piece of travel locus data.

8. An on-vehicle navigation apparatus according to claim 6, wherein said vehicle engine is activated or deactivated the vehicle is in a non-driving condition.

* * * * *